3,044,866
N-(2,3,6-TRICHLOROBENZOYL-L-LEUCINE AND HERBICIDAL USE THEREOF
Charles F. Krewson, Abington, Pa., assignor to the United States of America as represented by the Secretary of Agriculture
No Drawing. Filed Aug. 9, 1960, Ser. No. 48,508
5 Claims. (Cl. 71—2.6)
(Granted under Title 35, U.S. Code (1952), sec. 266)

A non-exclusive, irrevocable, royalty-free license in the invention herein described, throughout the world for purposes of the United States Government, with the power to grant sublicenses for such purposes, is hereby granted to the Government of the United States of America.

This invention relates to post-emergent control of undesirable vegetation in farm crops, and in particular relates to suppression of broadleaf weeds in castor beans and oats.

While the sodium salt of 2,3,6-trichlorobenzoic acid is quite effective in killing pigweed, mustard, lamb's-quarters and other broadleaf weeds such as ragweed, carpetweed and smartweed, commonly found growing in farm crops, this chemical cannot usually be applied because in almost all instances the herbicidal activity on the farm crops is equal to or greater than that on the weeds.

An object of the present invention is to prepare a selective herbicide from 2,3,6-trichlorobenzoic acid, retaining the herbicidal effectiveness against broadleaf weeds while diminishing or eliminating damage to farm crops.

Another object is to provide a selective herbicide for killing broadleaf weeds in castor beans, a crop of steadily increasing importance in the farm economy.

Further objects and a better understanding of the invention may be obtained from the following specification and claims.

According to the present invention it has been found that the L-leucine derivative of 2,3,6-trichlorobenzoic acid, also referred to as N-(2,3,6-trichlorobenzoyl)-L-leucine, when applied to growing plants, suppressed the growth of broadleaf weeds, and that, at levels of application phytotoxic to broadleaf weeds did not harm castor bean or oat plants, thus providing a method for control of broadleaf weeds in these farm crops.

N-(2,3,6-trichlorobenzoyl)-L-leucine was prepared by a Schotten-Baumann reaction of L-leucine and 2,3,6-tricholorbenzoyl chloride. The L-leucine was the best quality obtainable commercially. The 2,3,6-trichlorobenzoyl chloride was prepared by reacting purified 2,3,6-trichlorobenzoic acid, M.P. 135.5–138° C., with thionyl chloride by the method of Freed, J. Am. Chem. Soc. 68, 2112 (1946), using a 3 to 1 ratio of thionyl chloride. The product, obtained in 96% yield, had a boiling point of 68–69° C. at 0.2 mm. mercury pressure, $n_D^{26}$ 1.5900, and an elemental analysis corresponding to that calculated for 2,3,6-trichlorobenzoyl chloride. Preparation of the amino acid derivative is illustrated as follows:

*N-(2,3,6-trichlorobenzoyl)-L-leucine.*—A 0.5 M quantity (65.5 grams) of L-leucine was dissolved in 1500 ml. of 1.0 M sodium hydroxide solution and chilled to 5° C. A 0.5 M quantity (122.0 grams) of 2,3,6-trichlorobenzoyl chloride was dissolved in 1500 ml. of benzene and chilled to 5° C. The benzene solution was added dropwise during continuous stirring to the alkaline solution of L-leucine. The temperature was maintained at 5° C.; the time required for complete addition of the benzene solution was about 1 hour. The reaction mixture was stirred an additional 3 hours as it warmed up to room temperature. Three ethyl ether extractions were made of the alkaline reaction mixture using 500, 250 and 250 ml. portions of ether. These ether extracts were combined and washed once with 200 ml. of distilled water. This wash water was added to the ether extracted aqueous alkaline reaction mixture and the solution (pH 10.4) was adjusted to a pH of 1.2 with 10% hydrochloric acid; it was allowed to stand for 20 hours at 5° C. The crude white crystalline product was filtered off, slurried several times with distilled water, filtered off and vacuum dried at room temperature to constant weight, crude yield 135.0 grams (79.5%).

Purification consisted of extracting in a Soxhlet apparatus for about 20 hours with petroleum ether (B.P. 63–70° C.) to remove any 2,3,6-trichlorobenzoic acid; purified yield 122.6 grams (72.3%).

Commonly practiced procedures for preparing compositions containing N-(2,3,6-trichlorobenzoyl)-L-leucine in which the carrier is an inert solid or an aqueous liquid may be employed. In the examples the herbicide was applied as an aqueous spray in amounts sufficient to deposit on the growing area a weight of herbicide corresponding to 1 or 2 pounds, acid equivalent basis, per acre. These examples, presented for purposes of illustrating the invention, are not to be considered as limitations thereof.

EXAMPLE 1

The spray vehicle was equal parts of acetone and water containing 1% polyoxyethylene sorbitan monolaurate. Two concentrations of N-(2,3,6-trichlorobenzoyl)-L-leucine were prepared by adding 1.59 and 3.17 pounds of the leucine derivative, equivalent to 1 and 2 pounds, respectively, of the parent acid, to 40-gallon lots of the spray vehicle. For comparative purposes sprays containing the same acid equivalent were prepared by adding 1.1 and 2.2 pounds, respectively, of the sodium salt of 2,3,6-trichlorobenzoic acid to 40-gallon lots of the spray vehicle. Each of the four sprays were applied as a pre-emergence treatment at the rate of 40 gallons per acre to comparable plots sown to crops and weeds as indicated in Table I. Data for response to this pre-emergence treatment were obtained 60 days after spraying and are listed in the first four columns of Table I.

EXAMPLE 2

Spray compositions prepared as described in Example I were applied to growing plants having the following average heights (inches): castor beans—11; lima beans—7; cotton—4; safflower—9; sorghum—13; flax—12; oats—14; pigweed—6; mustard—8; and lamb's-quarters—9.

In each instance the spray was applied at a volume of 40 gallons per acre to provide, on an acid equivalent basis, either 1 or 2 pounds per acre. Post-emergent response data were obtained 28 days after spraying. Results are presented in columns 5 to 8 of Table I.

*Table I*

Herbicidal effect (percent killed) of pre-emergent and post-emergent spraying of crops and weeds with the sodium salt of 2,3,6-trichlorobenzoic acid and N-(2,3,6-trichlorobenzoyl)-L-leucine at levels of 1 and 2 pounds per acre based on acid equivalent]

| Plant | Pre-emergent | | | | Post-emergent | | | |
|---|---|---|---|---|---|---|---|---|
| | Sodium salt | | Leucine deriv. | | Sodium salt | | Leucine deriv. | |
| | 1 lb./ acre | 2 lb./ acre | 1 lb./ acre | 2 lb./ acre | 1 lb./ acre | 2 lb./ acre | 1 lb./ acre | 2 lb./ acre |
| Castor beans | 50 | 90 | 0 | 0 | 100 | 100 | 0 | 0 |
| Lima beans | 100 | 100 | 0 | 0 | 63 | 95 | 27 | 60 |
| Cotton | 60 | 80 | 0 | 10 | 80 | 95 | 10 | 37 |
| Safflower | 80 | 100 | 20 | 40 | 100 | 100 | 43 | 80 |
| Sorghum | 20 | 80 | 0 | 0 | 57 | 77 | 10 | 40 |
| Flax | 70 | 90 | 10 | 30 | 67 | 95 | 13 | 43 |
| Oats | 60 | 95 | 0 | 0 | 53 | 77 | 0 | 0 |
| Pigweed | 100 | 100 | 0 | 0 | 70 | 83 | 47 | 77 |
| Mustard | 90 | 95 | 20 | 30 | 47 | 63 | 47 | 77 |
| Lamb's-quarters | 100 | 100 | 10 | 40 | 70 | 83 | 47 | 77 |
| Broadleaf [1] | 60 | 90 | 10 | 40 | 70 | 83 | 47 | 77 |

[1] Mixture of ragweed, smartweed, carpet weed and volunteer mustard

As a pre-emergence herbicide, columns 1 to 4, the L-leucine derivative of 2,3,6-trichlorobenzoic acid was quite harmless to the majority of the plant crops, but the herbicidal effect on weeds was also reduced so greatly that this treatment does not appear practical. Whereas the parent acid, applied as the sodium salt, was a highly effective herbicide against broadleaf weeds, the leucine derivative was ineffective at the 1 pound per acre level and showed a maximum kill of 40% at the 2 pound per acre level.

Continuing across the table, columns 5 to 8, for post-emergent treatment of weeds, it will be noted that the application of 2,3,6-trichlorobenzoic acid, as the sodium salt, to the growing plants was less effective than the pre-emergent treatment of these weeds (comparison of columns 1 and 2 with 5 and 6). It was, therefore, most surprising to compare columns 7 and 8 with columns 3 and 4 and with 5 and 6 and fined that the leucine derivative as a post-emergent herbicide for broadleaf weeds, was not only several times as effective as it had been as a pre-emergent herbicide, but compared favorably with the sodium salt of 2,3,6-trichlorobenzoic acid.

The plant crops listed in Table I are representative of monocotyledonous and dicotyledonous plants to which the application of the sodium salt of 2,3,6-trichlorobenzoic acid is phytotoxic. We have found, however, that the herbicidal effect of the leucine derivative of 2,3,6-trichlorobenzoic acid is very specific, being only slightly reduced for lima beans and safflower, considerably reduced for cotton, sorghum and flax and exhibiting no herbicidal effect on the castor beans and oats. The practice of the present invention thus makes it possible to control the growth of broadleaf weeds in the latter crops.

I claim:

1. The process of killing a broadleaf weed comprising contacting said weed with a phytotoxic concentration of N-(2,3,6-trichlorobenzoyl)-L-leucine.

2. The process for the selective suppression of growth of broadleaf weeds in a field planted to a crop selected from the group consisting of castor beans and oats, comprising contacting growing weeds and growing crop with a concentration of N-(2,3,6-trichlorobenzoyl)-L-leucine which is phytotoxic to the weeds.

3. The process of claim 2 in which the crop is castor beans.

4. The process of claim 2 in which the crop is oats.

5. N-(2,3,6-trichlorobenzoyl)-L-leucine.

References Cited in the file of this patent
UNITED STATES PATENTS 2,394,916    Jones _____ Feb. 12, 1946
2,734,816    Wood et al. _____ Feb. 14, 1956